June 8, 1926.

N. RANSOHOFF 1,587,853

BUILDING BLOCK MOLDING APPARATUS

Filed August 6, 1923   3 Sheets-Sheet 1

Inventor
Nathan Ransohoff
By Wood o Wood
Attorneys

June 8, 1926.
N. RANSOHOFF
1,587,853
BUILDING BLOCK MOLDING APPARATUS
Filed August 6, 1923   3 Sheets-Sheet 2
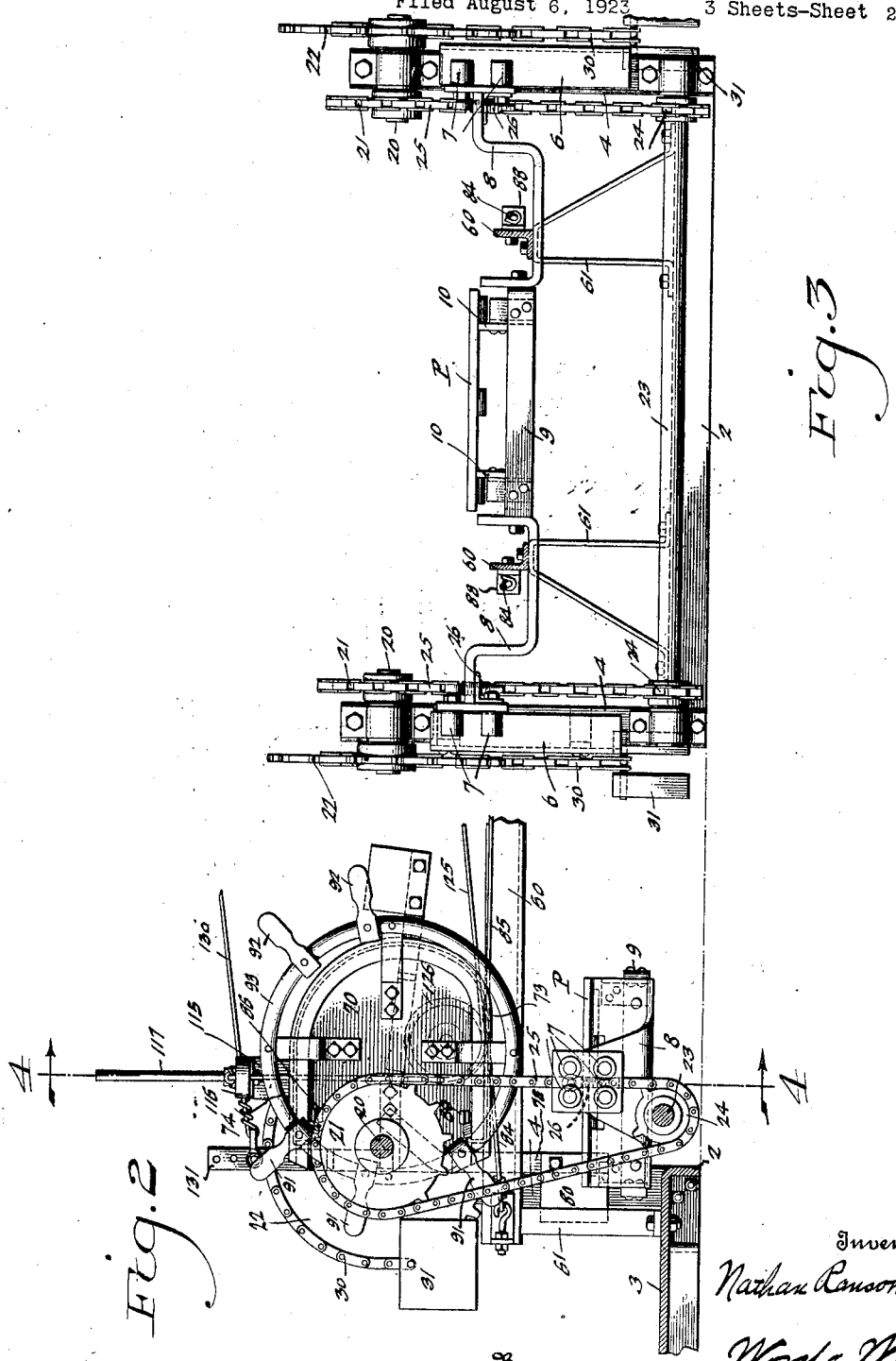
Inventor
Nathan Ransohoff
By Wood o Wood
Attorneys June 8, 1926.
N. RANSOHOFF
1,587,853
BUILDING BLOCK MOLDING APPARATUS
Filed August 6, 1923    3 Sheets-Sheet 3
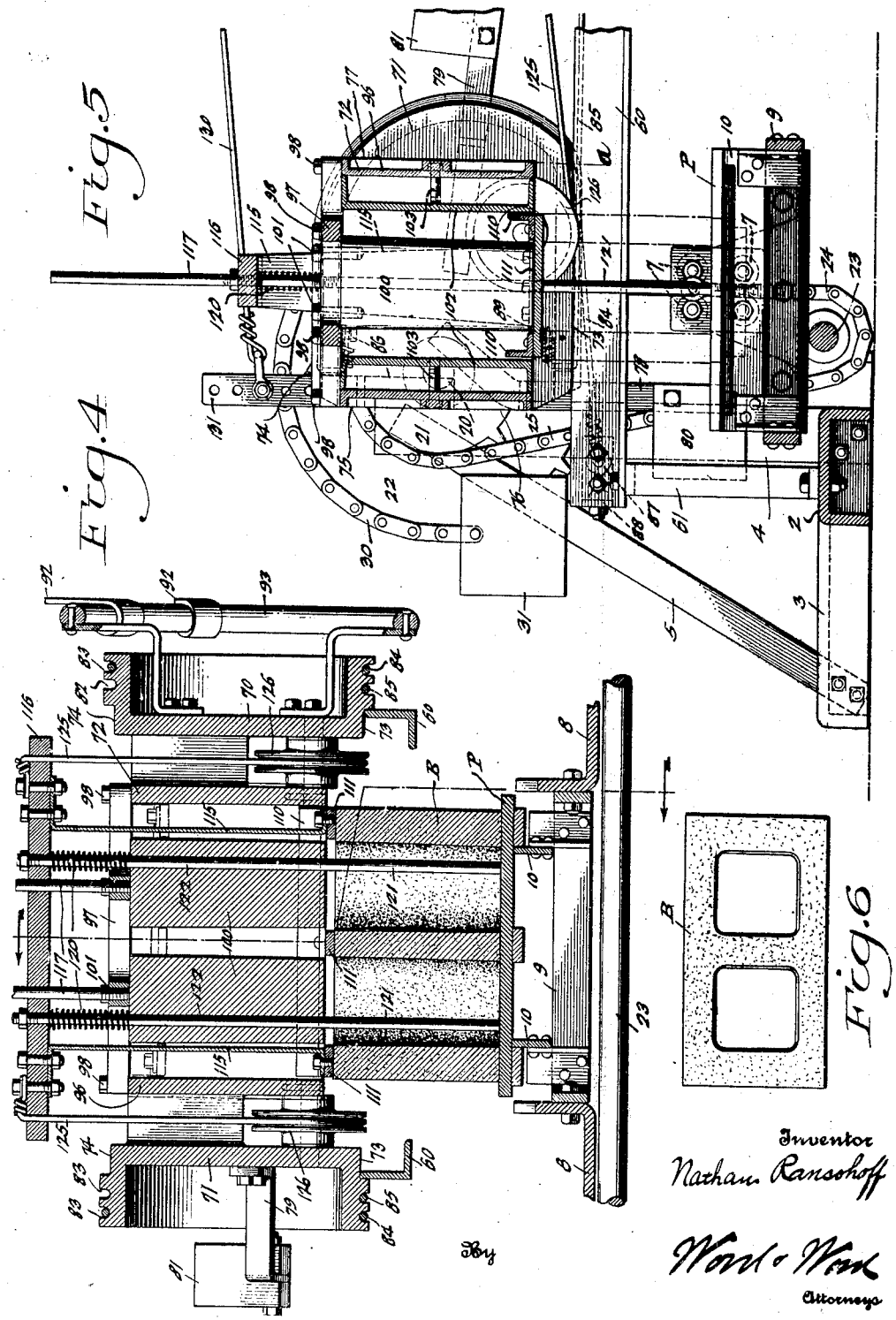
Inventor
Nathan Ransohoff
by Wood & Wood
Attorneys Patented June 8, 1926.

1,587,853

UNITED STATES PATENT OFFICE.

NATHAN RANSOHOFF, OF CINCINNATI, OHIO.

BUILDING-BLOCK-MOLDING APPARATUS.

Application filed August 6, 1923. Serial No. 655,799.

This invention relates to molding machines, particularly for concrete building blocks, in which concrete material in molding condition is deposited or loaded into a mold, tamped or pressed to give the required density or compactness and discharged from the mold usually upon a pallet, the pallet with the molded article thereon being thereafter removed.

The device or machine herein is particularly designed for molding hollow concrete or cement building blocks, but it is obvious that with slight modifications molded articles of different character, material, shape and size may be as conveniently produced without departing from the spirit of the invention.

An object of the invention is to facilitate the molding operation, particularly the emptying or discharge operation, by providing a rockable mold suitably supported and translatable and invertible during rocking motion between filling and discharge stations, from properly alined filling to aligned discharge positions in respect to said stations, the mold, mold box, or mold carrier being balanced and the power for translating and inverting the same being applicable in a manner requiring a relatively small amount of power.

Another object of the invention is to provide wheel-like curved rockers having terminal stops and rests at relatively opposite sides of the curved portions, whereby relatively stable and unstable placements of the mold may be obtained, respectively in discharge and filling positions, between which positions the mold is adapted to oscillate or rock without slipping upon its support.

Another object is the provision of means for holding the mold carrier upon its support without slipping or sliding during motion from one position to another, to obtain accurate registration or alignment of the filling and discharge end of the mold with the filling hopper and with the pallet upon which the molded article is to be deposited.

Another object is the provision of an ejector for forcing the molded article from the mold, the ejector being translatable with the mold from one side to the other and adapted to engage one side of the mold and form a bottom for the same.

Another object of the invention is to provide means for receiving and yieldably supporting the molded article during its discharge from the mold, whereby the article will not be damaged, said means consisting of a weight retractable pallet carrier-frame upon and against which the article rests and is forced as it leaves the mold.

Another object of the invention is to provide means for preventing or avoiding the application of undue pressures upon the molded article, incident to its discharge from the mold and during such discharge, as and when the article engages and is engaged with the pallet resting upon a depressible weight retractable pallet carrier, said means comprising rods operable by and movable with the ejector, said rods engaging the carrier or pallet thereon, and forcing the carrier away from the mold simultaneously with the ejection or discharge of the molded article.

Another object is the provision of means for balancing the mold whereby a minimum expenditure of force is required to oscillate, rock or rotate the same.

Another object is to provide for relatively stable and unstable placement of the mold and carrier respectively in discharge and filling positions, whereby the mold may be more easily rocked after being loaded, and whereby the same is held in stable position against rocking movement or upward displacement while the molded article is being discharged, the means for accomplishing the above objects being in the nature of relatively parallel flat terminal stops and rests of relatively different lengths disposed at opposite sides of the curved or rocker portions of the carrier, and as extensions of the curved surfaces.

Other objects and certain advantages will appear in the description of the drawings forming a part of this specification, in which drawings:

Figure 2 is a fragmentary longitudinal section showing the mold in discharge position, the pallet-carrying frame being depressed and the molded article omitted for the sake of clearness.

Figure 3 is a cross section on line 3—3, of Fig. 1.

Figure 4 is a detailed cross section through the mold when discharging, showing the molded article upon the pallet and the pallet-carrying frame depressed with the depressing rods engaging the pallet.

Figure 5 is a section on line 5—5, of Fig. 4, the molded article being omitted for the sake of clearness, and Figure 6 is a detailed view of one form of molded article, i. e., a hollow building block.

Figure 1:
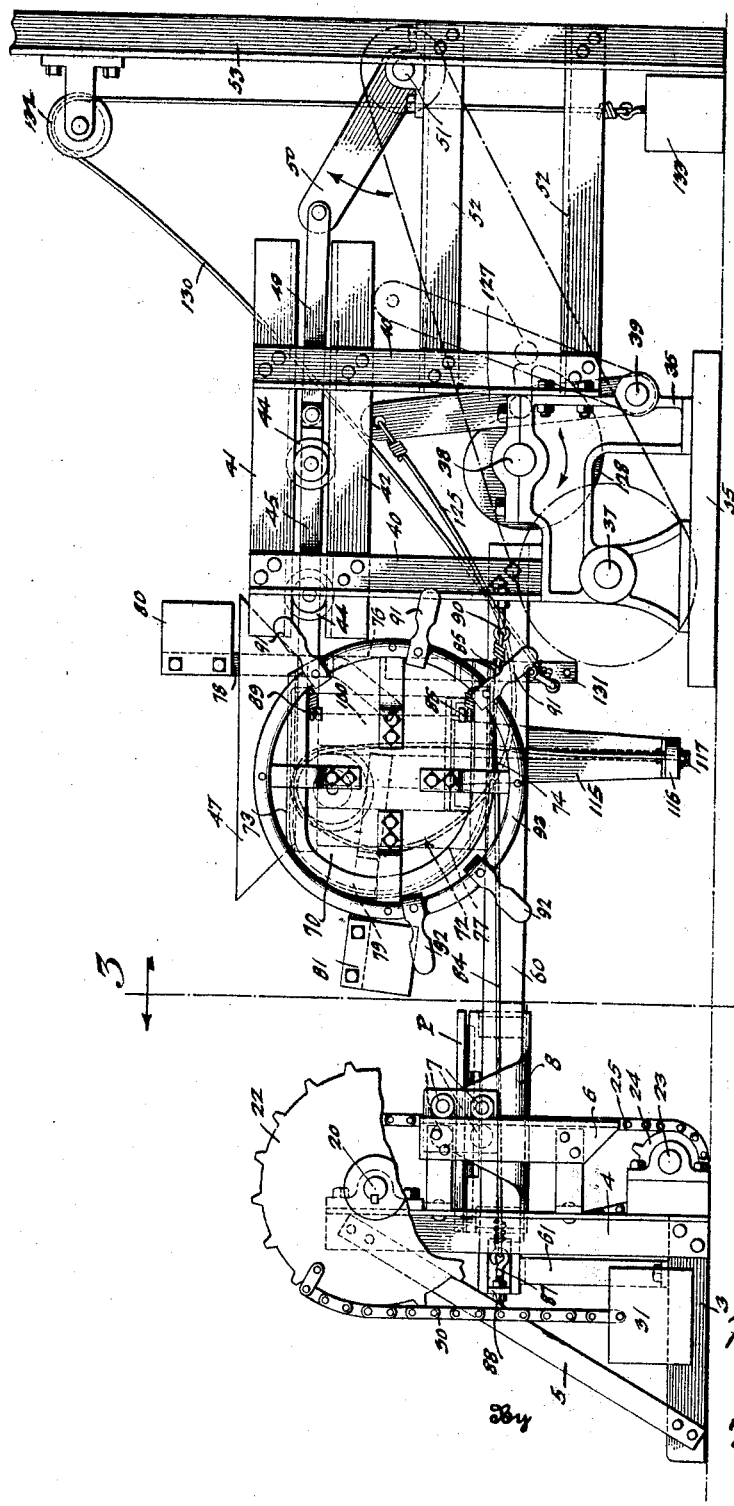
Figure 1 is a side elevation of my machine or apparatus with the mold in filling position.

The frames or supports for my improved apparatus are preferably constructed of structural iron bolted or riveted together, and include a front frame structure designed to support a depressible pallet carrier upon which the molded article is deposited during ejection from the mold, and a rear frame structure for supporting a retractable filling hopper or chute, and means for moving the chute forwardly to filling position, and rearwardly to non-filling position.

The forward and rear frame structures above designated are connected by and also support a track, upon which is mounted for limited rotation, oscillation or rocking between mold loading and discharge stations, a mold carrier having a mold box, or mold attached thereto, which carrier is adapted by a partial rotation in forward and reverse directions, to position the mold beneath the filling hopper, for filling, and over the pallet and depressible pallet carrier for discharging the molded article thereon. During this operation the mold is inverted by rotating the same through an arc of 180°, thus positioning the mold and contained article for discharge upon the pallet. The operation of translating the mold from filling to discharge position, and vice versa, is, herein, manually performed, but the same may be accomplished by any suitable power. The operation of discharging the article from the mold may be automatically or manually performed. In order that mold translation may be performed with a minimum of muscular effort, or application of power, the mold carrier is counterbalanced by suitable weights arranged at substantially right angles to one another, one adapted to lie above and below the mold respectively when the mold is in filling and discharging positions, to steady the mold and prevent accidental displacement of the mold carrier. Means is also provided for "easing" the carrier as it approaches discharge position, and additional means is provided for holding or tracking the carrier during rotation or oscillation, to prevent slippage and obtain accurate registery of the mold box, respectively with the filling hopper and open end of the mold, at limits of movement in each direction.

The front pallet-carrying frame is in this instance, of substantially right angular configuration, and comprises a three-sided base formed of channel irons, including a cross piece 2 and right angularly related end extensions 3, bolted or otherwise secured thereto. At the opposite end of the cross piece 2 are attached upwardly extending parallel L-irons 4—4, diagonally braced by elements 5 attached at the upper ends of the elements 4 and to the end extensions 3. To the inner faces of the L-irons 4—4 are attached by brackets and disposed in vertical parallel relation, tracks or guides 6—6. Engaged at opposite sides of and against one flange of each track are guide rollers 7 mounted upon plates attached vertically at the outer ends of sheet metal members 8 of the pallet-carrying frame or elevator. This reciprocable pallet-carrying frame is preferably constructed of sheet metal, and the members 8 are attached to a central rectangular frame 9 having parallel tracks or pallet supports 10 extending upwardly therefrom and lengthwise of the machine. Upon the supports, a pallet P is removably disposed, a number of such pallets being ordinarily provided, one for each molded article, upon which the molded article is deposited by the mold ejector, said article and pallet being thereafter removed.

Rotatable in bearings at the upper ends of the uprights 4—4, are horizontally disposed shafts 20, one for each upright, each shaft having on its inner end a lifting sprocket wheel 21 and at its outer end at the opposite side of the upright a counter-balanced sprocket wheel 22. Carried in bearings at the bottom of the uprights 4 is a cross shaft 23 having sprockets 24 thereon, one for each wheel 21, and placed vertically therebeneath. Sprocket chains 25 connect pairs of wheels 21, 24, the ends of each chain being connected as at 26 to the corresponding member 8. Each sprocket 22 has attached thereto one end of a chain 30, having a counterweight 31 at its lower end.

The pallet-carrier during the extraction of the molded article from the mold, is depressed against the action of the weights or counterbalanced elements 31 which have sufficient mass to overbalance the frame and return and maintain the same in its normal position when the molded block is removed from the carrier. The excess of counterbalanced weight over that of frame and pallet is preferably slight, and only sufficient to cause the frame to travel upwardly at a relatively slow rate of speed after the moulded block has been removed. The pallet carrier provides means for receiving and supporting the molded article as it is discharged from the mold.

The rear frame consists of suitable bases 35, having bolted thereto castings 36 containing bearings for a main drive shaft 37, a cam shaft 38, and a crank shaft 39. Mounted upon each casting 36 is a frame composed of vertical frame members 40, having adjacent their tops at their inner sides, parallel tracks 41, 42, between and against which are engaged flanged wheels or rollers 44, attached at each side and at the rear of an open rectangular frame 45, bridging the space between said frames, and translatable upon the rollers 44. Upon the forward end of the frame is disposed a hopper or chute 47, through which the molding material is guided or directed to the mold. At the rear of the frame 45 is attached one end of a pitman 49, connected at its opposite end with a crank 50 rotatable with a shaft 51 held horizontally upon the upper L-iron of a pair of duplicate irons 52, as braces connected to members 40, and supporting vertical irons 53. At the outer end of the shaft 51 is a pulley or sprocket connected by a belt or chain, with a corresponding driving wheel or sprocket on the shaft 39, these elements being shown in dotted and dashed lines. The hopper, however, may be moved from one position to another, in any desired manner such as will retract the hopper after the tamping operation, and return the same to filling position after the mold is returned to filling position, the cam and lever being operable to actuate an ejector carried by the mold, when the mold is positioned for discharge over the pallet, as hereinafter described.

Extending lengthwise between and attached to the front and rear frames, is an elevated track composed of horizontally disposed parallel L-irons 60, having their rear ends connected to the uprights 40, and their front ends supported upon brackets 61 bolted to the upper side of the channel iron 2. The rails extend forwardly of the pallet-carrying frame, above the members 8, said members engaging the rails as stops to limit upward movement of the frame. The upper surface of the pallet, when positioned on the frame with the frame in its uppermost position, lies above the upper edges or tread portions of said rails 60.

Mounted for rotative or rocking movement between the hopper or chute and the said pallet-carrying frame, and upon said rails, is a mold box carrier comprising hollow drums 70, 71, as wheel-like or rocker elements between which and attached thereto is a rectangular mold box 72, of less width than the distance between the rails. The wheel-like or rocker element, and mold, mold box, or mold section, are formed preferably of metal, and cast in a single piece, to form the rockable mold or mold carrier, but may be constructed of separable sections and the sections bolted together. The configuration of each rocker element is substantially that of a rectangle, having one curvilinear side, said side merging into opposite parallel sides 73, 74, of relatively different lengths as stops and rests for limiting rotative or rocking movements in each direction and for stabilizing the mold and carrier in filling and discharge position, the outline of each curved rocker being substantially that of a segment of an ellipse, the said segment including that portion extending from one extremity of the major axis to a point intermediate between an extremity of the minor axis and the opposite end of the major axis, the total length of the curve being less than half of the elliptical figure, and the major axis of the ellipse being at an angle to parallel sides or stops of unequal length. The curve in practice is, however, not that of a perfect oval or ellipse, but is preferably composed of two joined circular segments, large and small, the center of the segment of larger radius is approximately at the center of the mold box, but may be slightly offset from an imaginary line midway between and parallel with the opposite parallel sides, and the center of the segment of smaller radius is immediately adjacent one of the parallel sides, and laterally of the first-mentioned center. Thus the opposite parallel sides form terminal stops at opposite ends of the curved portion of the rocker to limit rocking and translative movement of the mold in each direction and to stabilize the same during the charging and emptying operation.

The mold or mold box 72 as herein shown, is of rectangular configuration but may be of any desired shape, and the same is positioned between the parallel straight sides 73, 74, respectively long and short, the discharge side or end of the box being parallel with the long side 73 and spaced a relatively greater distance from that side than the opposite or bottom side of the box, which is slightly spaced from the short side 74. The side 75 of the mold box is in this instance flush with the side 76 of the rockers, and its opposite side 77 is substantially spaced from the curved sides of the rockers. The point at which the smaller circular segment merges into the straight side 73, lies substantially in a prolongation of the side 77 of the box, as indicated at $a$, Fig. 5, and is virtually the pivotal point upon which the mold swings or rocks away from discharge position, after ejection of the molded article. As a result of the position of this pivotal point the edge or discharge side of the mold box or carrier will be raised to clear the molded article to avoid breaking of the same after said article has been ejected from the mold and as the carrier begins its movement to filling position. It will be noted that as the mold travels away from discharge position the center of gravity is gradually raised to a high point, and then gradually lowered as the mold approaches filling position, the curved portion of the rocker acting as a rolling pivot.

As shown in Fig. 1 when the mold carrier is in loading or filling position, the longer circular or elliptical segments of the rockers extend upwardly and forwardly from those sides or stops of shorter length, which engage the rails, thereby disposing the carrier in relatively unstable equilibrium, compared with its state when resting upon the longer sides, adapting the carrier to be, after loading, more easily rocked, tilted, rolled or oscillated to the left toward the pallet carrier, to invert the mold box and dispose the same in discharge position. When the carrier and mold box are in discharge position as shown in Fig. 2, the longer straight sides or stops engage flatly against the rails, and the shorter curved segments extend upwardly and rearwardly, thus obtaining a more stable placement of the carrier while the molded article is being discharged.

Additional means for stabilizing and balancing the mold carrier are provided, which consist of weights 80, 81, attached at the outer end of arms 78, 79, which arms are attached to the element 71. The arms in this instance, lie substantially at right angles to one another, one of the arms being horizontally disposed when the mold carrier is positioned at either limit of movement, and the other being vertically disposed and lying above the mold carrier at one limit, and below in the other. As shown in Fig. 1, the weights are disposed to assist in oscillating the filled mold, the horizontal weight assisting in starting the rotation of the carrier in anti-clockwise direction, the weight of the vertically disposed weight, subsequently being added to that of the other to additionally assist. When the mold carrier is positioned as in Figs. 2 and 5, in discharging position, the weight of the mold in conjunction with the disposition of the long sides of the carrier, act to hold the carrier against lateral or upward movement while the molded article is being forced downwardly from the mold by the ejector mechanism hereinafter described.

The elements 71, 72 are circumferentially notched at their inner faces to form a flange which engages the rail, to guide and support the mold carrier, and each element is provided in its periphery, in this instance with two grooves 82, 83, extending the full length of the parallel and curved sides. Guide cables 84, 85, engage with the grooves, to steady and guide the drums in such manner than when the carrier is rotated or oscillated, registry or alignment will be assured between receiving and discharge ends of the mold box, and the hopper and pallet respectively. For this purpose, one end of the cable 84 is attached at the extremity of the short side of the drum as at 86, and the opposite end is secured as at 87 to a bracket 88 attached to the outer side of the rail beyond the pallet-carrying frame, the other cable 85 is attached at the extremity of the long side as at 89, and at the other extremity is fastened as at 90 to the upright 40, said cables passing around the drum in opposite directions.

One of the drums has attached at its outer side to a circular ring 93, radially disposed handles 91, 92, preferably in substantially diametrically related groups, as shown, the said handles being related to the mold box and weights in a manner to permit of the most advantageous application of power for oscillating the mold carrier.

The mold box herein is of cored structure, designed for forming a hollow building block of the form shown at B in Fig. 6, and comprises an outer rectangular box-like casing 96 formed in this instance, of pairs of end and side elements suitably fastened together, said casing being open at one side and partially closed at the opposite side by a spider 97 which is bolted thereon as at 98. Attached at the inside of the casing 96 to the spider in properly spaced relation, are metallic cores 100 held by bolts 101 to the spider. The cores extend through the casing and their ends lie flush with the end of the casing. Removably attached within the box on opposing sides are box-like castings 102, extending the full length of the box and held by screws 103. The inner faces of the irons are suitably spaced from the cores 100 to provide continuous mold space for forming the wall of the block. Substitute irons of varying thickness may be used conformable to the desired variation in wall thickness of the block, the thicknesses of the irons being increased or decreased conformable to such changes.

A combined mold bottom and ejector is slidably disposed within the box and adapted to travel from one side to the other, and in one position to engage the spider as a stop and form a mold bottom, during the filling operation. After travelling across the box as an ejector to its other position said ejector projects a sufficient distance beyond the opposite end of the box to force the molded article out of and clear of the box. The combined bottom and ejector frame is herein composed in this instance, of two parallel L-irons 110, and three cross strips 111, the irons and strips substantially corresponding in size and arrangement to the area and shape or relation of the walls of the molded article, it being understood that when the configuration of the walls of the article are changed, corresponding changes will be made in the ejector frame. The ejector frame may, however, be cast in one piece, and a set or series of substitute ejector frames, as castings of various shapes conforming to the shape of the articles to be molded, may be provided.

Attached to and extending from the end crosspiece 110 are thrust plates 115, attached at their opposite ends to a cross beam 116, lying outside of the box and mounted slidably upon parallel guide rods 117, which are of sufficient length to guide and support the cross beam between its limits of movement in both directions, respectively at its outer limit to position the ejector frame against the spider, and at its inner limit to position the outer face of the frame outside the mold box or mold. In the former position the beam is spaced sufficiently from the spider to allow insertion of compression springs 120 which are interposed between said spider and beam, for drawing or retracting the frame or ejector, to a position within the mold and against the spider, after the discharging operation. The springs preferably surround pallet-carrying frame depressing rods 121, two in number, and of equal length, which rods slidably traverse longitudinally disposed openings 122 in the cores 100. One end of each rod is anchored in the cross beam, and the opposite end of each is adapted to lie flush with the discharge end of the mold box during filling position, in a manner to avoid interference with the levelling operation, and is also adapted to subsequently engage and depress the pallet during discharge of the molded article thus preventing pressure upon the moist article from opposite sides, which pressure would deform said article. The outer ends of the rods preferably engage the pallet simultaneously with its engagement by the molded article, although the engagement may take place slightly before or slightly afterwards. Means manually or automatically operable, is provided for operating the ejector to force the molded article from the mold box or mold, after said mold has been properly positioned over the pallet, which means comprises cables 125 respectively attached at one end to opposite extremities of the beam 116, which cables engage around grooved pulleys 126 positioned at opposite sides of the mold box, and are rotatable upon horizontal journals stepped in the box and adjacent drum. The opposite ends of respective cables are attached to the cam-operated levers 127, movable with shaft 31, each lever being engagable by a cam 128, upon shaft 38. The rotation of the cam shaft 38 is so governed that the cams will function to throw the levers rearwardly or in clockwise direction as soon as the mold carrier is positioned for discharge over the pallet, thus drawing the cables taut and forcing the ejector frame to a position shown in Fig. 4. When the frame reaches its outer limit the cams cease to function and the springs 120 retract the ejector.

Additional means in the nature of a counter-balance is provided, to add to the ease of operation in bringing the mold or mold carrier, from discharge to filling position, which consists of a cable 130 attached to an extension 131 bolted adjacent the extremity of the short side of one of the drums 71, said cable passing over a pulley 132, held upon the upright iron 53, at the rear of the machine, said cable having a weight 133 at its lower end. As the mold carrier approaches discharge position, approximately at the time the small curved portion of the drums engages the track, the weight is lifted clear of the ground, and the carrier is slowed or "eased" to final position over the pallet, acting at this time to neutralize the effects of the weight 80, and after the molded article is discharged assisting in conjunction with the handles in lifting or starting the mold carrier on its return movement.

With the mold carrier and mold positioned as in Fig. 1, the mold is filled, and the material tamped by suitable mechanism not herein shown, after which the hopper is retracted, the handles grasped by the operator and the carrier turned through an angle of 180°, to invert the mold and position the delivery end of the same over the pallet, held in raised position upon the pallet elevator or carrier. When the mold is so positioned, the cams 128 are operated, either manually or automatically, in clockwise direction and engage the pins, throw the levers to the right, draw the cables taut, and cause the ejector to travel slowly downwardly and force the molded article out of the mold. The ends of the rods 121 engage the pallet P and depress the pallet-carrying frame as the molded article is forced from the mold, the said rods travelling with the ejector frame; thus the molded article does not function to depress the pallet carrier or frame, and is relieved from pressures which, were it not for the rods, would crush and deform the moist molded article.

The pallet carrier is depressed by the rods against the action of the weights or counterbalancing elements, which elements have sufficient mass to overbalance the pallet-carrying frame, and return the same to its uppermost positions after the molded article has been removed.

The mold carrier or rockable mold herein, may be used and operated upon any suitable support, and without the movable bottom and ejector, in which instance a suitable stationary bottom would be provided. When used in this manner the grooves 82, 83, may or may not be dispensed with, and the outer peripheral portion of the rockers may engage the support, to provide the rocking pivot for translating and inverting the mold.

Having described my invention, I claim:

1. In a machine of the class described, a support, and a mold having rockers engaged with said support for rotating and translating the mold upon the support, said rockers having terminal stops of unequal length for limiting mold rotation from upright to inverted position, and for obtaining different degrees of equilibrium of mold placement, in those positions.

2. In a machine of the class described, a support, and a mold having curved rockers engaged with said support for rotating and translating the mold upon the support, said rockers having flat unequal portions engageable with said support for stabilizing mold placement in different degrees at limits of movement.

3. In a machine of the class described, a support, and a mold having curved rockers engaged with said support for rotating, translating and inverting the mold upon the support, said rockers having at opposite extremities flat portions of relatively different lengths as extensions of said curved rockers, engageable with said support for obtaining different degrees of stability of mold placement respectively in upright and inverted positions.

4. In a machine of the class described, a support, and a mold having curved rockers engaged with said support for rotating, translating and inverting the mold upon the support, each rocker having long and short flat portions as extensions of the curved portion of the rocker, alternately engageable with said support for obtaining relatively stable and unstable placements of the mold respectively in inverted and upright positions.

5. In a machine of the class described, a support, a mold having rockers engaged with said support, said rockers having curved portions including joined curves of long and short radius, said curved portions adapting the mold for rotation and translation, and said rockers having relatively parallel portions respectively as extensions of said curved portions for obtaining relatively stable placement of the mold when in upright position, and relatively unstable placement of the mold when in inverted position.

6. In a machine of the class described, a support, a mold having curved rockers engaged with said support for rotating and translating the mold, said rockers having relatively short flat sides merging into irregular curved sides at an angle to said short sides, said curved sides merging into relatively long flat sides parallel with the first-mentioned sides, whereby said mold is rotatable, translatable and completely invertible from upright to inverted position, and whereby different degrees of mold placement are obtainable respectively in upright and inverted positions.

7. In a machine of the class described, a support, a mold, rockers for said mold each having a relatively short flat side engageable with said support, said short side merging into a curved portion of relatively long radius which in turn merges into a curved portion of relatively short radius, the curved portion of short radius merging into a relatively long flat side parallel with the short side, whereby the mold is rotatable, translatable and invertible from upright to inverted positions, and whereby relatively unstable and stable placements of the same are obtained respectively in upright and inverted positions.

8. In a machine of the class described, a support, a mold box having rockers of irregular curved configuration engaged with said support, the opposite ends of the curved portions of said rockers having flat stop portions as extensions of said curved portions, said rockers and stop portions adapting the mold for rotation, translation, complete inversion and arrest of motion upon said support.

9. In a machine of the class described, a track, a mold carrier supporting a mold box, said carrier having curved rockers engaged with said track, said rockers having terminal stops for engagement with said support to limit movement of said carrier, and means for guiding and holding said carrier against slippage upon said track.

10. In a machine of the class described, a track, a mold box having curved rockers, said box rotatable upon said rockers, each rocker having terminal stops for engagement with said track to limit rotation and translation of said mold box, and means for guiding and holding said mold box against slippage upon said track.

11. In a machine of the class described, a track, a mold having flanged curved rockers engaged with said track, means for holding said rockers against slippage upon said track, said rockers having flat portions as extensions at relatively opposite sides for limiting rocking movement of the mold and obtaining stable placement of the same in upright and inverted positions.

12. In a machine of the class described, a track, a mold having rockers engaged with said track, means for guiding and holding said rockers against slippage upon said track, terminal stops as extensions of said rockers engageable with said track for limiting rocking movement of the mold, a translatable bottom within said mold, resilient means for holding said bottom at one side of the mold, and means for forcibly moving said bottom toward the opposite end of said mold.

13. In a machine of the class described, a track, a depressible pallet-carrier frame at one extremity of said track, means for retracting said frame to upper position, a mold having curved flanged rockers engaged with said track, said rockers having flat portions forming stops at opposite ends of said rockers for limiting rocker movement, means for preventing slippage of said rockers upon said track, a bottom and an ejector translatable within said mold, means for translating said ejector for forcing a molded article from the mold, and rods movable with said ejector for engaging and depressing said carrier frame simultaneously with its engagement by the molded article during ejection from the mold.

14. In a machine of the class described, a track, a mold having curved flanged rockers engaged with said track, the curved portions of each rocker merging into flat relatively parallel portions of different lengths and at relatively opposite sides of the said curved portions for limiting mold rotation and translation, and for stabilizing the placement of said mold in relatively different degrees at opposite limits of rotative movement, means for rotating the mold, and means attached to said mold for additionally stabilizing and balancing the same.

15. In a machine of the class described, a track, a mold having oppositely disposed and aligned curved flanged rockers engaged with said track for rotating and translating the mold, the curved portion of each rocker terminating at opposite ends in flat relatively parallel portions forming stops for limiting rotation of said mold and for complete mold inversion upon the support.

16. A mold, having curved flanged rockers, the curved portion of each rocker having substantially the form of that portion of an ellipse less than the distance between the extremities of its major axis, including joined curved portions of relatively different radius, the opposite extremities of the elliptical curved portion merging into relatively parallel straight sides of unequal length, the major axis of the elliptic figure being inclined with respect to said parallel sides, and the plane of the discharge end of the mold being parallel with that side of greatest length.

17. In a machine of the class described, a support, a depressible pallet carrier frame at one extremity of said support, means for retracting said frame to uppermost position, a mold having curved flanged rockers engaged with said track, said rockers having flat parallel sides of relatively different lengths as stops at opposite ends of the curved portions of said rockers for limiting mold movement and obtaining relatively stable and unstable placements of the same respectively in upright and inverted positions, means for preventing slippage of said rockers upon said track, a bottom and ejector for and translatable within said mold, means for translating said ejector for forcing the molded article from the mold, and means movable with said ejector for engaging and depressing said carrier frame simultaneously with its engagement by the molded article, whereby injurious crushing strains upon the article are avoided.

18. In a machine of the class described, a track, a mold having curved flanged rockers of substantially segmental elliptical shape including joined curved portions of relatively long and short radius engaged with said track, the longer curved portion of the rocker merging into a flat relatively short stop portion, and the shorter curved portion merging into a flat relatively long stop portion, said curved and flat portions adapting the mold for limited rotation, translation and complete inversion from the track and stabilization of the mold in relatively different degrees at opposite limits of movement, means for rotating the mold, and means attached to said mold for stabilizing and balancing the same.

19. A mold, having oppositely disposed and aligned flanged rockers engageable with a support, each rocker having a central irregularly curved portion terminated at relatively opposite ends in flat parallel portions engageable with said support adapting said mold for limited oscillation and translation in opposite directions and for complete inversion during oscillation and translation.

20. A mold, having rockers, said rockers having portions of substantially the shape of an elliptical segment including curved portions of short and long radius, the opposite ends of said elliptical segment merging into parallel straight sides of relatively different lengths as extensions of said segment, the curved portion of shorter radius merging into that side of greater length and the curved portion of longer radius merging into that side of shorter length.

21. A mold, having flanged rockers, said rockers having curved portions substantially of the form of that segment of an ellipse included between the extremities of a major axis and comprising curved portions of relatively different radius, that portion of smaller radius merging into a relatively long straight side and that curved portion of longer radius merging into a relatively short straight side parallel with the long side, the major axis of the elliptic figure inclined with respect to said parallel sides and the plane of the discharge end of the mold parallel with and spaced from the long side.

22. In a machine of the class described, a frame providing a track, and a mold translatably supported upon said track having rockers engaged non-slippingly with the track, said mold rotatable during translation upon said track for alternately disposing said mold in upright or inverted positions.

23. In a machine of the class described, a frame providing a pair of rails, and a mold having rockers at its opposite ends respectively sustained upon said rails, rotatable for translation to dispose the mold in alternate upright or inverted positions, said rockers having a rail tread surface formed for limiting the rotative capacity of the rocker and to stabilize the mold in its upright or inverted positions.

24. In a machine of the class described, a frame providing a track, a mold translatably supported upon said track having rockers of different lengths, non-slippingly engaged with the track, said mold rotatable during translation upon said track for alternately stationing said mold in upright or inverted positions, and a depressible carrier disposed to cooperate with the mold in its inverted position to receive and sustain the molded article as discharged from the mold.

25. In a machine of the class described, a frame providing a pair of rails, a mold having rockers at its opposite ends respectively sustained upon said rails, rotatable for translation to station the mold in alternate upright or inverted positions, said rockers having a rail tread surface formed for limiting the rotative capacity of the rocker and to stabilize the mold in its upright or inverted stations, and a depressible carrier disposed to cooperate with the mold in its inverted position to receive and sustain the molded article as discharged from the mold.

26. In a machine of the class described, a frame providing a track, a mold translatably supported upon said track rotatable for translation upon said track for alternately stationing said mold in upright or inverted positions, a depressible carrier disposed to cooperate with the mold in its inverted position to receive and sustain the molded article as discharged from the mold, and an ejector carried by said mold operative for ejecting the molded article and depressing the carrier when the mold is stationed in an inverted position and provide a base for the mold when the mold is in its upright station.

27. In a machine of the class described, a frame providing a pair of rails, a mold having rockers at its opposite ends respectively sustained upon said rails, rotatable for translation to dispose the mold in alternate upright or inverted positions, said rockers having a rail tread surface formed for limiting the rotative capacity of the rocker and to stabilize the mold in its upright or inverted positions, and an ejector carried by said mold operative for ejecting the molded article and depressing the carrier when the mold is stationed in an inverted position and provide a base for the mold when the mold is in its upright station.

In witness whereof, I hereunto subscribe my name.

NATHAN RANSOHOFF.